US005458260A

United States Patent [19]

Sainato et al.

[11] Patent Number: 5,458,260

[45] Date of Patent: Oct. 17, 1995

[54] CARTRIDGE TUBE DISPLAY UNIT

[75] Inventors: Anthony Sainato, Westlake, Ohio; Thomas Conway; Scott Padiak, both of Chicago, Ill.

[73] Assignee: The Glidden Company, Cleveland, Ohio

[21] Appl. No.: 231,757

[22] Filed: Apr. 25, 1994

[51] Int. Cl.$^{6}$ .............................. G07F 11/04; B65G 59/06

[52] U.S. Cl. ............................ 221/22; 221/156; 221/172; 221/283; 221/303; 221/311; 221/312 R; 312/45

[58] Field of Search .................................. 221/22, 28, 66, 221/130, 131, 123, 124, 156, 172, 194, 281, 282, 283, 242, 311, 312 B, 312 C, 312 R, 303; 312/35, 45, 72, 73, 350

[56] References Cited

U.S. PATENT DOCUMENTS

| | | | |
|---|---|---|---|
| 1,576,010 | 3/1926 | Swartz | 221/311 X |
| 1,666,575 | 4/1928 | Lee | 221/311 X |
| 2,226,626 | 12/1940 | Mann | 221/311 X |
| 2,302,166 | 11/1942 | Anthony | 312/45 X |
| 2,360,573 | 10/1944 | Mena | 221/311 |
| 2,667,991 | 12/1953 | Petrecca | 221/283 X |
| 4,037,756 | 7/1977 | Jaquish | 221/242 |
| 4,850,511 | 7/1989 | Kral et al. | 221/311 X |
| 5,056,683 | 10/1991 | O'Brien et al. | 221/312 R X |
| 5,316,154 | 5/1994 | Hajec, Jr. | 312/45 X |

FOREIGN PATENT DOCUMENTS

| | | | |
|---|---|---|---|
| 394433 | 6/1933 | United Kingdom | 312/45 X |

*Primary Examiner*—William E. Terrell
*Assistant Examiner*—Dean A. Reichard
*Attorney, Agent, or Firm*—Thomas M. Schmitz

[57] ABSTRACT

The invention pertains to a modular display for merchandising tubular cartridges containing adhesives, caulks, sealants or similar flowable elastomeric materials, where each cartridge contains a narrow dispensing nozzle at one end of the cartridge. The modular display unit comprises structural means for automatically aligning the cartridges horizontally and orientating the nozzles forwardly while stacking the cartridges in vertical rows by gravity feed. The internal structure includes a slotted front panel where the slot engages the narrowed nozzles but prevents passage of the enlarged tube end of the cartridge. The display unit enables the consumer to remove cartridges from the bottom and to reinsert cartridges at the top along with maintaining the intended forward orientation and horizontal alignment in the vertically stacked cartridges.

7 Claims, 3 Drawing Sheets

CARTRIDGE TUBE DISPLAY UNIT

This invention pertains to a modular display case particularly suitable for use as one of a series of identical display units where each display unit is adapted to contain a plurality of cylindrical cartridges or tubes stacked in vertical rows within each unit to provide a point of sale display.

BACKGROUND OF THE INVENTION

Small cartridge containers or tubular products are typically packaged in elongated cylindrical tubes such as wallpaper or food products. Fluid or resinous consumer products, such as adhesives, caulks, sealants, and glues are typically packaged in cylindrical tubes having a narrow dispensing nozzle at one end. For instance, caulk tubes having an extended dispensing nozzle can be stacked vertically upright with the nozzle extending upwardly, or alternatively, can be stacked horizontally with the nozzle extending outwardly. Such methods of display are unsatisfactory for a variety of reasons including inordinate amounts of shelf space required and awkward accessibility to the consumer. Hence, such tubes are difficult to display in an efficient manner to utilize minimum shelf space while maintaining easy accessibility to consumers.

It now has been found that a modular display unit can be manufactured to contain one or more vertical rows of horizontally orientated cartridge tubes which can be loaded into the display unit from the top and by gravity feed each tube becomes readily accessible to the consumer by removal at the bottom. If the adhesive tube removed is incorrect for the consumer's needs, the incorrect tube can be replaced by the consumer simply by reinserting the tube in the upper opening and removing another tube from the bottom until the consumer obtains the correct selection. Preferred internal construction of the display unit prevents the consumer or retailer from inadvertently inserting the tube in an incorrect alignment and always requires the dispensing nozzle end to be orientated outwardly. The gravity feed ordinarily assures normal first-in/first-out rotation of stock. These and other advantages of the invention will become more apparent by referring to the drawings and the detailed description of the invention.

SUMMARY OF THE INVENTION

Briefly, the modular display unit of this invention comprises an elongated container adapted to receive and dispense one or more vertically aligned rows of horizontally disposed consumer cartridge tubes. The internal construction of the display unit provides for top loading vertical alignment along with gravity feed and removal from the bottom. Preferred units accommodate consumer cartridges where each tube has a forwardly directed dispensing nozzle. The internal front panel contains narrow alignment channels which engage the forwardly extending dispensing nozzle and prevent reverse insertion of the tube while the rear panel contains forwardly extending dividers to assure single row vertical alignment of the tubes within a display unit containing more than one vertical row of cartridge tubes.

DETAILED DESCRIPTION OF THE INVENTION

Figure 1:
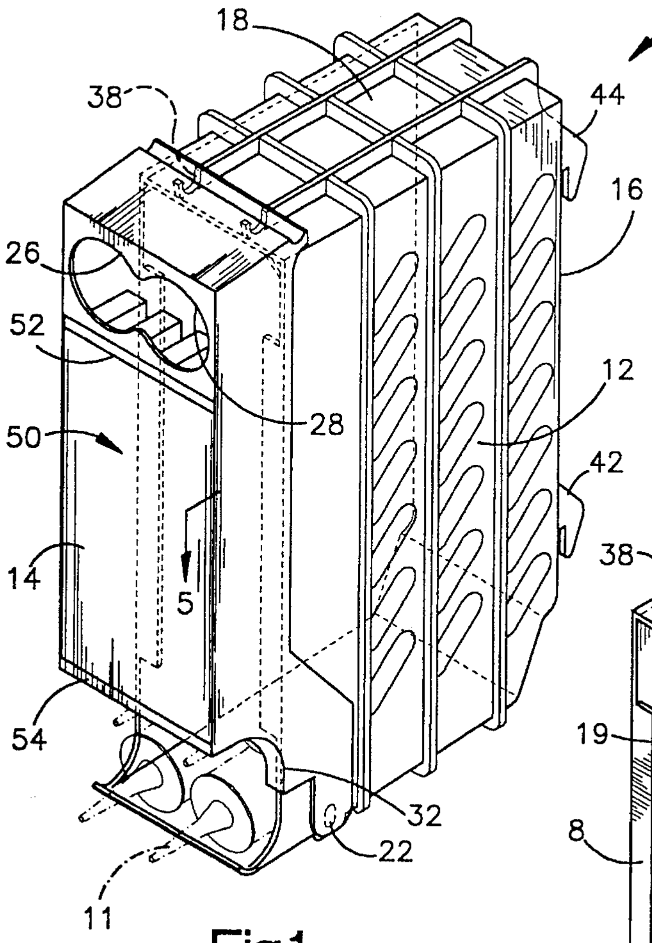
FIG. 1 is a frontal perspective view of the modular display unit of this invention containing caulk tubes.

Referring now to the drawings wherein like reference characters designate like parts, shown is the modular display unit 10 of this invention for containing elongated cartridge tubes 11 having a dispensing nozzle 9 at one end of the tube 11.

Figure 2:
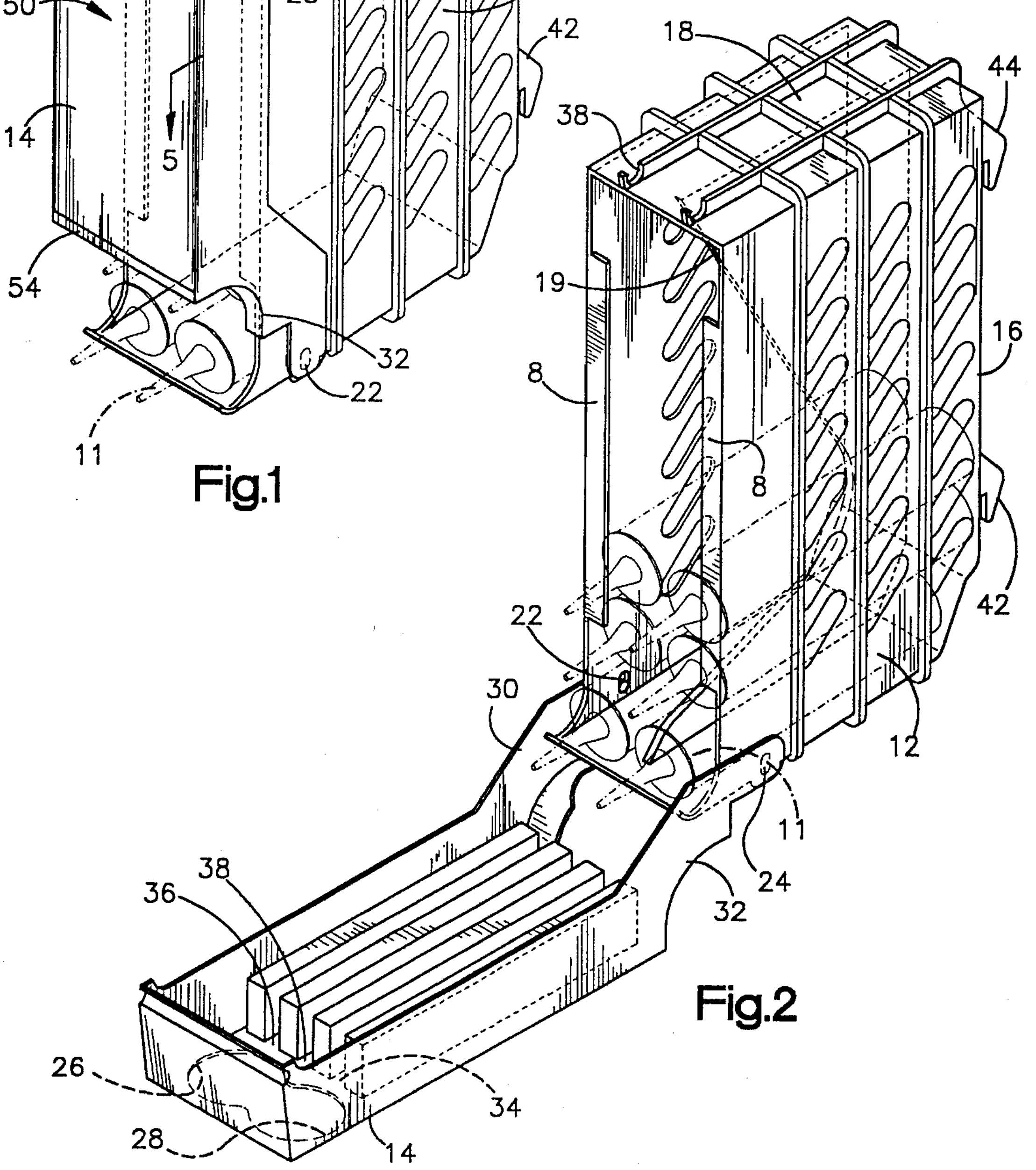
FIG. 2 is the perspective view of the display unit in FIG. 1 shown with the front panel of the unit rotated to an open position.
Figure 5:
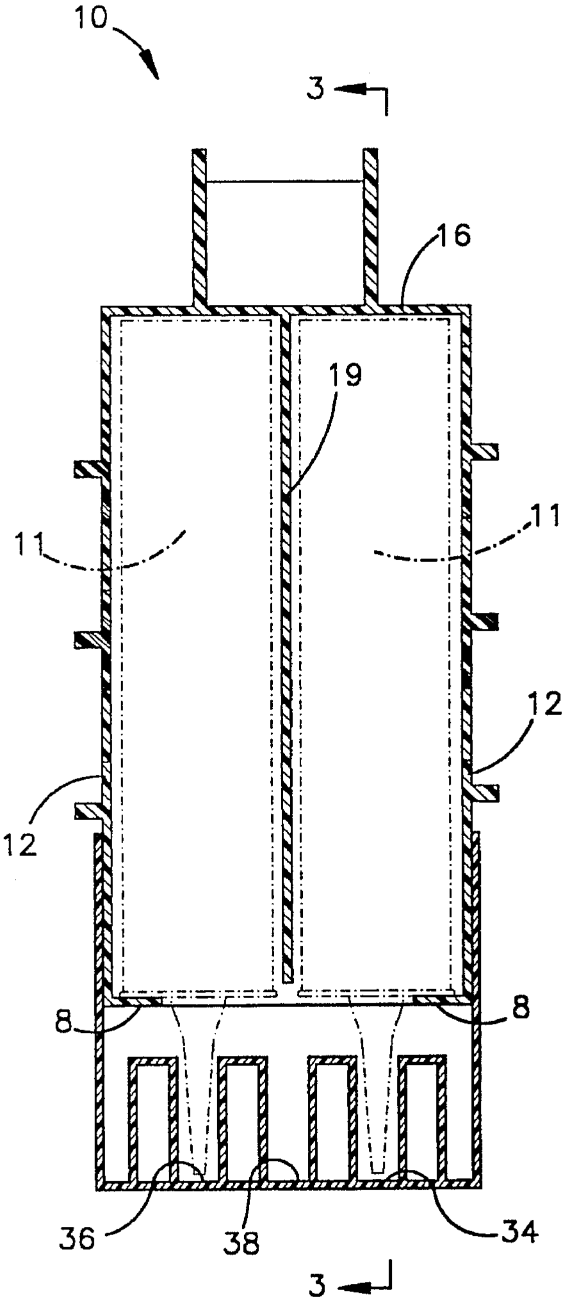
FIG. 5 is a horizontal cross-sectional view taken along lines 5—5 in FIG. 1.

The modular display unit 10 comprises a container having an interior enclosure defined by a pair of side panels 12, a front panel 14, and a rear panel 16 as well as top and bottom panels 18, 20, where the rear and side panels can be molded integrally if desired. The front panel 14 can be fixed, but preferably is pivotably operative to open, as shown in FIG. 2, by rotating outwardly. Lower pivotal connections 22, 24 are preferred although similar pivotal connections at the top can be utilized if desired. The uppermost section of the front panel 14 contains two alignment openings 26, 28 aligned with individual interior compartments within the display unit 10 adapted to stack tubes in two separate single row vertical alignments. The lowermost section of the front panel 14 is essentially a recessed open space defined by depending laterally spaced arcuate connecting members 30, 32 rotatably secured to the front panel 14 by pivotal connections to the container sides 12 at pivotal points 22, 24. The display unit 10 is divided internally by a dividing means 19 to provide two separate internal compartments disposed laterally side by side, as seen in FIGS. 2 and 5.

The internal structures of the front panel 14, as best shown in FIG. 2, comprises two vertical alignment channels 34, 36 laterally spaced by an intervening central spacing means 38 such as a raised shoulder or parallel dividers. The spacing means 38 is adapted to force gravity drop of the cartridge tubes into either one of the side channels 34, 36 aligned respectively with openings 28, 26 in conjunction with preventing backward insertion of the cartridge tube into the display unit 10. In this regard, the width of each channel 34, 36 is sufficient to accommodate the thickness (diameter) of the cartridge dispensing nozzle 9 while maintaining vertical alignment of the stacked cartridge tubes 11, as best viewed in FIG. 5. The width of each channel 34, 36 is considerably less than the width (diameter) of the cartridge tubes 11, which prevents backward insertion of the tube 11 into the display unit 10. The depth of each channel 34, 36 accommodates the length of the dispensing nozzles 9 and likewise assists in vertical alignment of the tubes 11. Forward alignment of the tubes 11 with the dispensing nozzles 9 extending outwardly is assured by maintaining the internal depth of the display unit 10 slightly longer than the length of the cylindrical tube member of the cartridge 11, as best viewed in FIG. 5, but considerably less than the overall length of the cartridge 11 including the dispensing nozzle 9. Accordingly, the flat bottom of the cartridge tube 10 interfaces with the rear panel 16 while the dispensing nozzle aligns within the channels 34, 36. The internal depth of the display unit 10 accommodating the cylindrical tube part of the cartridge 11 prohibits backward insertion of the cartridge tubes 11 into the display unit 10. The display unit 10 can be opened and closed, but preferably contains a mechanical pressure locking means 38 comprising a depressing monitor extending upwardly and adapted to interlock with a slotted member in the door 14 whereby mechanical friction prevents undesirable unlocking during consumer use of the display unit 10. Elongated, vertically orientated, narrow stops 8 are secured to the front edge of each side panel 12 to prevent forward movement of the upper tubes 11 when the door 14 is open.

Figure 3:
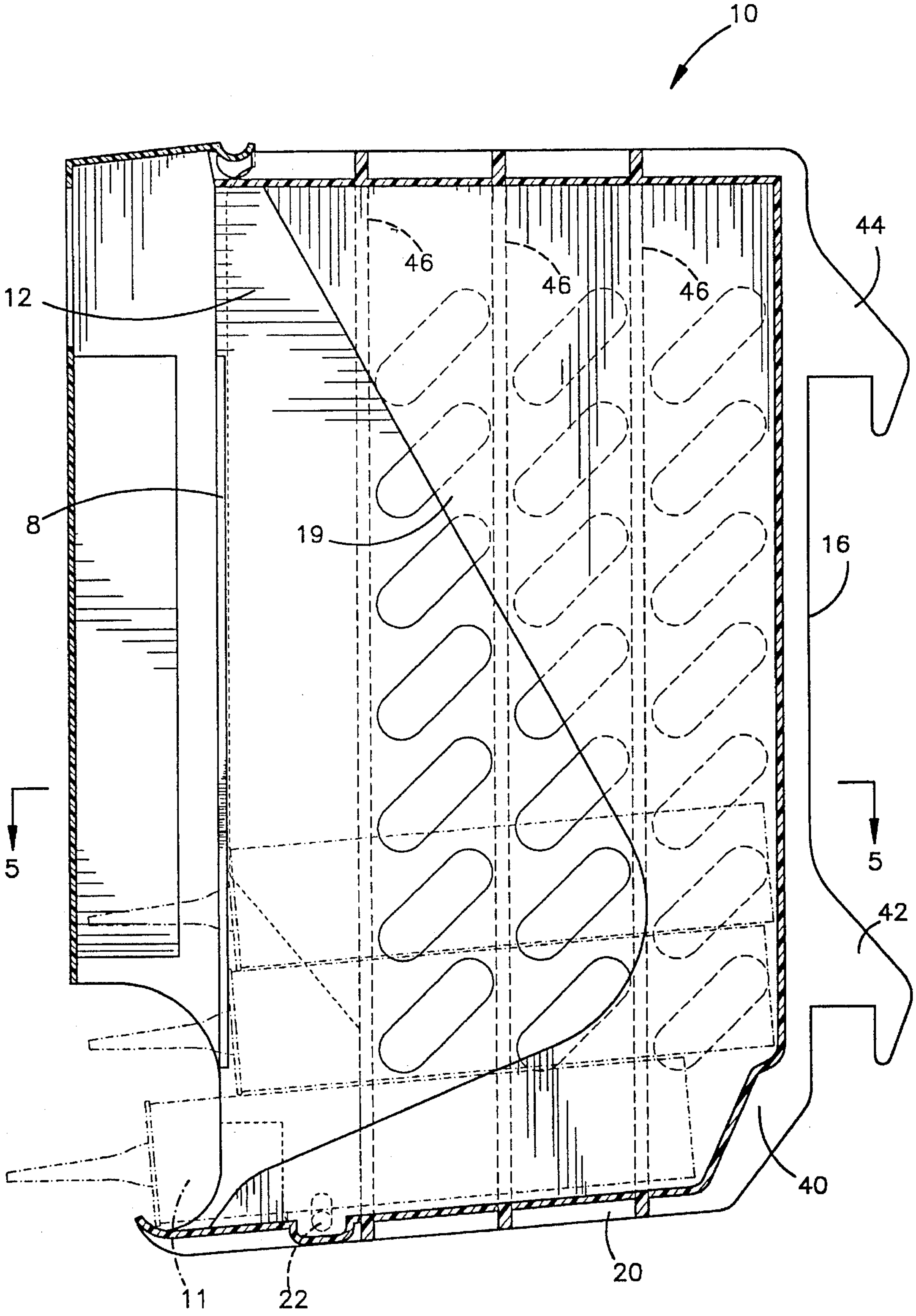
FIG. 3 is a side elevation sectional view of the display unit in FIG. 1 with the side panel removed to show the interior of the display unit.
Figure 4:
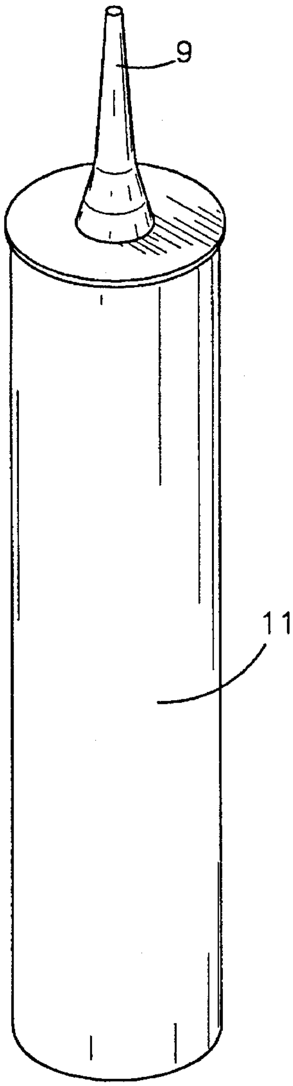
FIG. 4 is an enlarged perspective view of a cylindrical tube product shown as a caulk tube standing upright.

Referring now to FIG. 3, the bottom panel 20 of the display unit 10 preferably has a downward interconnecting member in the rear comprising an angular abutment 40 interposed between the bottom panel 20 and the rear panel 16. The rear angular abutment 40 is adapted to force the lowermost cartridge tube 11 forwardly to provide easier access for the consumer to the lowest cartridge 11 in the display unit 10. The rear panel 16 contains a pair of hanging members 42, 44 adapted to hook onto existing display racks or supports. Each side panel 16 can contain a plurality of exterior vertical reinforcing ribs 46, shown partially in FIG. 3, which provide structural strength to the display unit 10, but also can provide interlocking friction engagement with an adjacent display unit. To provide an interlocking fit between adjacent modular display unit 10, the reinforcing ribs 46 are forwardly or rearwardly offset on the left side of each unit 10 relative to placement of the ribs 46 on the right side of each unit 10. Hence, the offset sets of ribs 46 (left side) and 46 (right side) can frictionally engage or interlock on adjacent modular units to provide stabilizing interlocking between the modular units and form a merchandising display comprising several interlocking modular units 10.

In use, several modular display units 10 of this invention can be hung on any type of external supporting means separate from the display unit such as horizontal support bars or slotted openings in vertical supports by simply inserting and interlocking the hanging members 42, 44 of each unit 10 with the support means. Adjacent units 10 can be interlocked by engaging external vertical ribs 46 of adjacent display units 10 as previously described. The front panel 14 or door can be opened by depressing the locking means 38 and rotating the door 14 downwardly to fully expose the interior compartment of the display unit 10 and enable the retailer to quickly load the unit. Although less preferred, the front panel can be maintained locked and the unit loaded by simply inserting single cartridge tubes 11 through openings 26, 28 in the top of each unit 10. The horizontally disposed cartridge tubes 11 by necessity are all aligned in vertical rows with the dispensing nozzles 9 all extending forwardly. The front panel or door 14 is again locked for consumer use. A point of sale advertising display sheet or card 50 can be affixed to the face of the front panel 14 by any adhering means or friction fitted within upper and lower slots or channels 52, 54 respectively.

A consumer approaching the merchandising display comprising several modular units 10 can readily see the advertising of the type of adhesive or caulk or other polymeric sealant with the cartridge tubes 11 contained within the display units 10. The consumer selects the type of adhesive or caulk indicated by simply removing the bottom most cartridge 11 from the display unit 10. If the cartridge 11 for some reason is not suitable or is not the one intended, this undesired cartridge 11 can be properly inserted in the top openings 26 or 28 and a new cartridge can be selected from the bottom. The selection format can be repeated if necessary until the proper cartridge is selected.

The modular display unit of the invention provides an orderly and easy access method for selecting cartridge tubes 11 containing adhesives, caulk or similar sealant materials. The modular display system of this invention effectively provides an estimated 23% retail space savings relative to prior methods of shelf retailing. The units are easy to install or dismantle from simple existing supporting devices. Although preferred embodiments of the invention are disclosed herein, the invention is not intended to be limited thereby except the appended claims.

We claim:

1. A merchandising display of two or more modular display units for displaying horizontally disposed elongated tubular cartridges, where each cartridge comprises an elongated enclosed tube having a narrow dispensing nozzle at one end of the tube, each modular display unit comprising:

at least one internal compartment having a front panel and a rearward panel, each compartment adapted to align and stack the horizontally disposed cartridges in a vertical row and permit gravity drop within the internal compartment, where the dispensing nozzle of each cartridge is orientated forwardly;

the front panel containing a narrow vertical channel aligned with each internal compartment, the narrow channel adapted to receive and guide the dispensing nozzle during the gravity drop of each cartridge within the internal compartment, where the channel is sufficiently narrow to obstruct receiving the tube of the cartridge and prevents insertion of the cartridge within the display unit unless the dispensing nozzle of the cartridge is orientated forwardly within the narrow channel;

said front panel having a lowermost opening for exposing at least a lowermost cartridge within the display unit to enable removal of the lowermost cartridge from the display unit; and the merchandising display containing two or more modular display units where the modular display units are located side-by-side in a lateral row, and where the modular units have side panels containing vertical ribs where the vertical ribs on adjacent side panels are offset to provide a friction engagement between the modular display units.

2. A modular display unit for displaying horizontally disposed elongated tubular cartridges, where each cartridge comprises an elongated enclosed tube having a narrow dispensing nozzle extending from one end of the tube, the modular display unit comprising:

a structural unit enclosure having a front door, a back panel, and a pair of laterally spaced side panels, the enclosure containing two or more internal compartments located laterally side by side, where each compartment is adapted to align and stack the horizontally disposed cartridges in a vertical row and permit gravity drop within the compartment, a lowermost part of the rear panel angled forwardly to force the lowermost cartridge forwardly within the structural unit to facilitate removal of a lowermost cartridge from the modular display unit, the front door of each structural unit containing an upper opening in alignment with each internal compartment for receiving the cartridges, the front door having a lowermost opening for exposing at least the lowermost cartridge within each internal compartment and enable removal of the lowermost cartridge from the display unit, the front door operative to open and expose the internal compartments, the front door of the structural unit containing an interior narrow guide channel for each internal compartment, where each guide channel is vertically aligned with one of the internal compartments, each guide channel adapted to receive and guide the dispensing nozzle during the gravity drop of each cartridge within the aligned internal compartment when the front door is closed, where each internal guide channel is sufficiently narrow to obstruct receiving the tube of the cartridge and prevent insertion of the cartridge within the display unit unless the nozzle is oriented forwardly.

3. The modular display unit of claim 2 where the front door contains two or more upper separate openings where each separate upper opening is in alignment with one of the internal compartments.

4. The modular display unit of claim 2 where the lowermost opening in the front door is an open space defined by laterally spaced structural members pivotally connected to the bottom of the modular display unit.

5. The modular display unit of claim 4 where the spaced structural members are accurate shaped members adapted to provide a receded lowermost opening in the door.

6. A merchandising display comprising two or more of the modular display units of claim 2 located side-by-side in a lateral row, the modular units having side panels containing external vertical ribs where the vertical ribs on adjacent side panels are off-set and provide friction engagement between adjacent modular units to form the merchandising display, the merchandising display containing means for supporting the modular units on an external support means.

7. A merchandising display containing two or more modular units for displaying horizontally disposed elongated cartridges, each modular unit comprising:

a structural unit enclosure having a front door, a back panel, and a pair of laterally spaced side panels, the enclosure containing two or more internal compartments located laterally side by side, where each compartment is adapted to align and stack the horizontally disposed cartridges in a vertical row and permit gravity drop within the compartment, the front door containing an upper opening in alignment with each internal compartment for receiving the cartridges, the front door having a lowermost opening for exposing at least a lowermost cartridge within each internal compartment to enable removal of the lowermost cartridge from the display unit, the front door operative to open and expose the internal compartments, the rear panel having a lowermost part angled forwardly to force the lowermost cartridge forwardly within the display unit to facilitate removal of the lowermost cartridge from the display unit: and two or more modular units located side-by-side in a lateral row, the modular units having side panels containing external vertical ribs where the vertical ribs on adjacent side panels are off-set and provide friction engagement between adjacent modular units to form the merchandising display, the merchandising display containing means for supporting the modular units on an external support means.

* * * * *